March 29, 1932.  D. H. LAMAR  1,851,850

ELECTRIC IMPACT MOTOR

Filed March 25, 1929   3 Sheets-Sheet 1

David H. Lamar,
INVENTOR

BY Victor J. Evans
ATTORNEY

March 29, 1932.                D. H. LAMAR                 1,851,850
                           ELECTRIC IMPACT MOTOR
                    Filed March 25, 1929        3 Sheets-Sheet 2
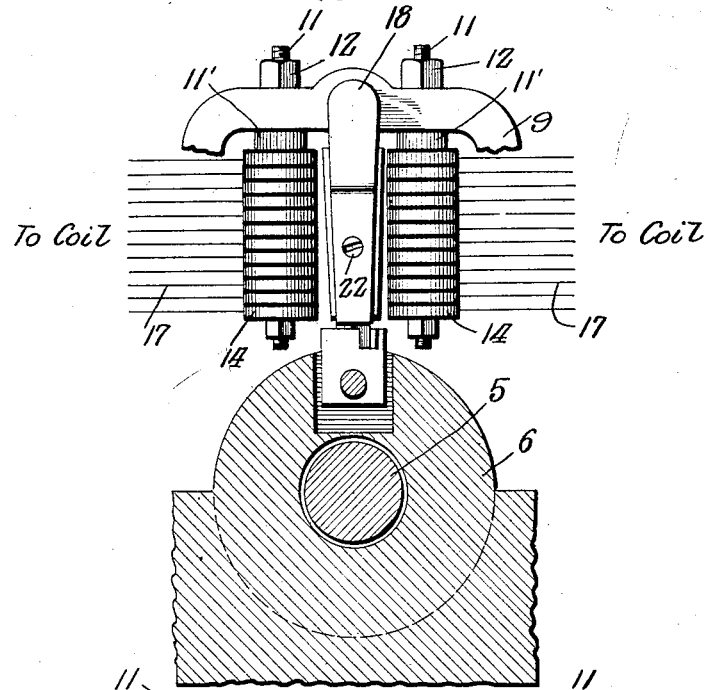
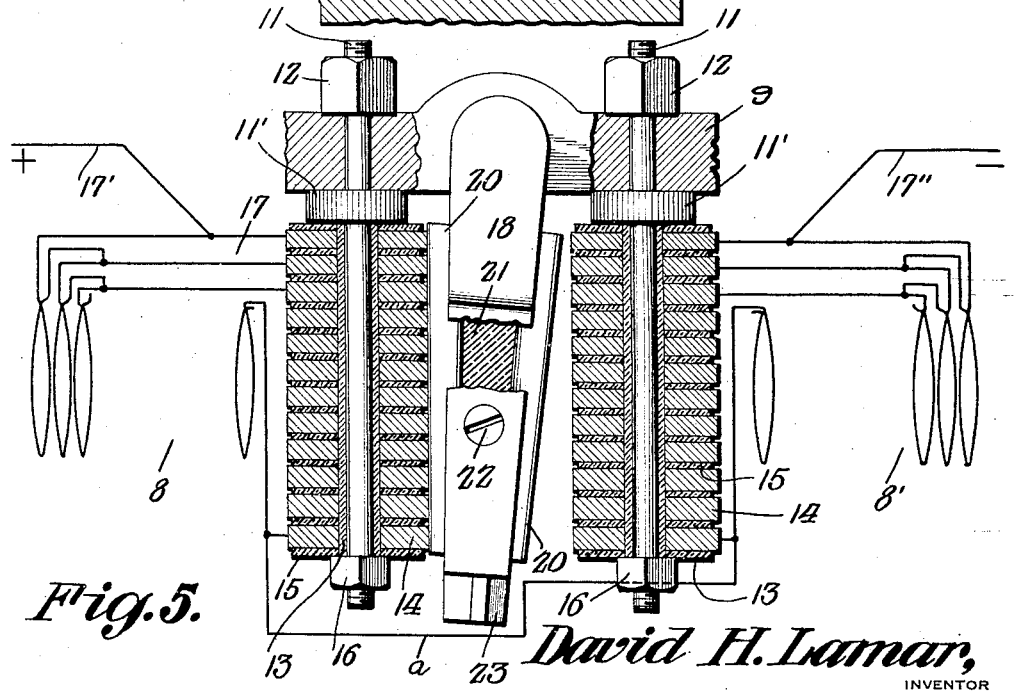

March 29, 1932.                D. H. LAMAR                1,851,850
                         ELECTRIC IMPACT MOTOR
                  Filed March 25, 1929       3 Sheets-Sheet 3
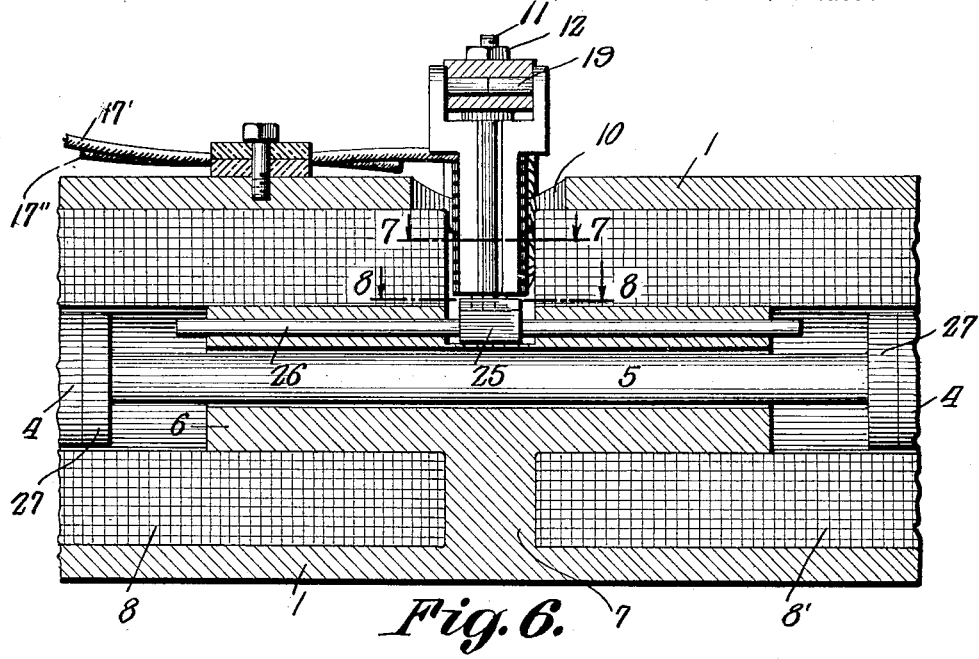
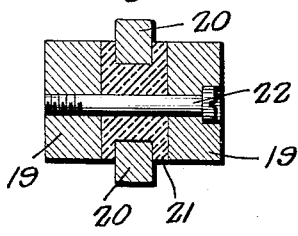
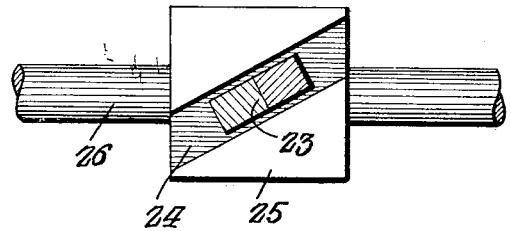
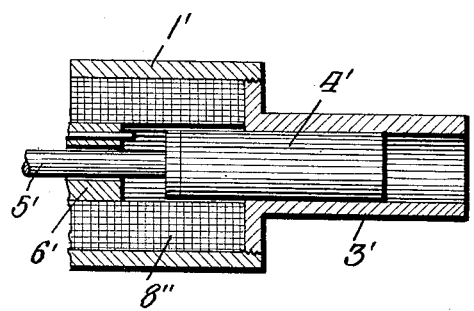
David H. Lamar,
INVENTOR
BY Victor J. Evans
ATTORNEY Patented Mar. 29, 1932

1,851,850

UNITED STATES PATENT OFFICE

DAVID HENRY LAMAR, OF FAIRMONT, WEST VIRGINIA

ELECTRIC IMPACT MOTOR

Application filed March 25, 1929. Serial No. 349,806.

This invention relates to a direct current reciprocating impact motor, the general object of the invention being to so construct and arrange the parts that the motor will have much power, is ready to function without the incorporation of any extra machinery, is simple but strong in construction and is able to undergo hard service and rough handling and can be operated from a storage battery.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1:
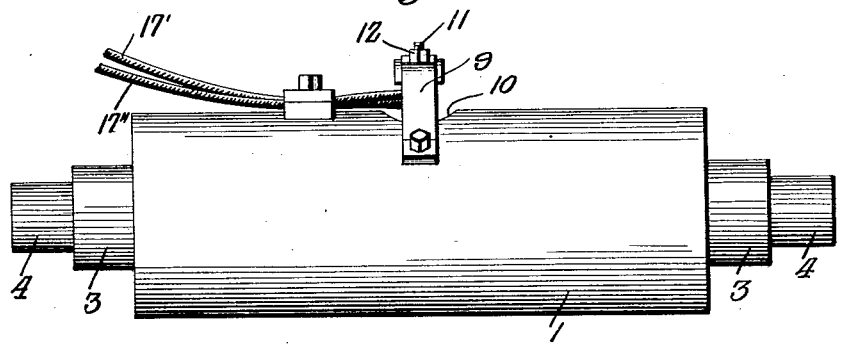
Figure 2:
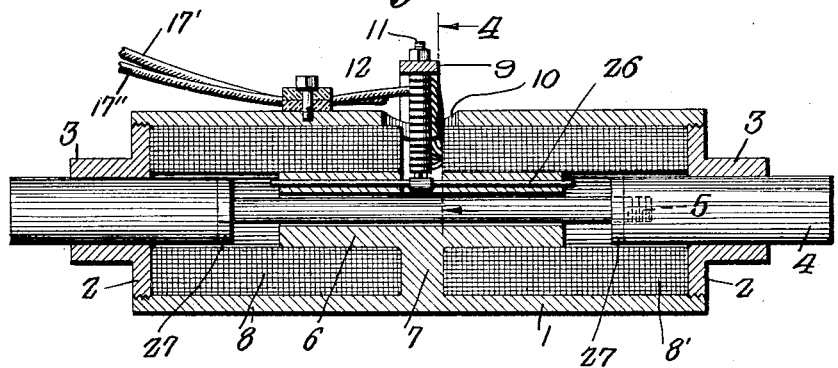
Figure 3:
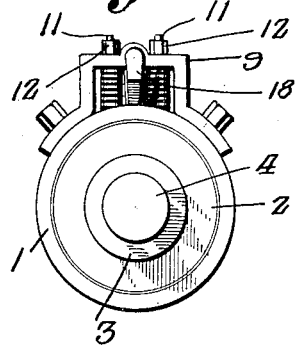

Figure 1 is an elevation of the invention.
Figure 2 is a longitudinal sectional view.
Figure 3 is an end view.
Figure 4 is an enlarged section on line 4—4 of Figure 2.
Figure 5 is an enlarged sectional view, partly diagrammatic, of the grouped contacts for the coil layers.
Figure 6 is an enlarged longitudinal sectional view through the central part of the device.
Figure 7 is a section on line 7—7 of Figure 6.
Figure 8 is a section on line 8—8 of Figure 6.
Figure 9 is a detail sectional view showing a slight modification.

In these drawings, the numeral 1 indicates a casing which has its ends open and internally threaded to receive the end pieces 2, each of which is provided with a tubular part 3 which forms a guide for each plunger head 4, the heads being connected together by the stem 5. A tubular core 6 is arranged in the central part of the casing and is supported by the division wall 7 of the casing, the stem 5 passing through the core and the coils 8 and 8' each including layers arranged in the casing have their inner ends surrounding the core. These coils are readily removable by removing the end pieces 2.

As will be understood, when an electric current passes through layers of either coil, the same will be energized from its axis to the periphery and a magnet field will be set up, the magnetic lines circling through the core, the division wall, the casing and then the magnetic lines will pass to the inner end of the plunger, thus creating two magnetic poles, one being said end of the plunger and the other the end of the core. Thus the plunger will be attracted by the core and the plunger will be moved in one direction and when the other coil is energized, the same action will take place and the plunger will be moved in the opposite direction.

A bridge piece 9 is fastened to the top of the casing at the center thereof and extends over an opening 10 formed in the casing and a pair of bolts 11 have their upper ends passing through the bridge piece, each bolt having a collar 11' thereon which contacts the lower edge of the bridge piece and a nut 12 on each bolt contacting the upper edge of the bridge piece, holds each bolt in vertical position and depending into the casing through the opening. A tubular member 13 encircles each bolt, this member being formed of insulating material, and a plurality of rings 14 of conducting material are placed on the tubular member, these rings being separated by the disks 15 of insulating material, all the parts being held on the bolt by the nut 16 threaded on the lower end thereof. The rings 14 of one bolt are connected by the conductors 17 with the parts of the coil 8, and the rings on the other bolt are connected by similar conductors with the parts of the coil 8'.

A brush holder 18, formed of two sections, is pivotally supported at its upper end from the central part of the bridge piece by the pins 19, one on each section, passing into a hole formed in the bridge piece. The metallic brushes 20 are carried by a strip 21 of non-conducting material which is placed between the two sections of the brush holder and the sections in this strip are connected together by a bolt 22. As shown, the brushes project from each side of the holder and one brush will engage the rings 14 of one set when the holder has been moved in one direction and the other brush will engage the rings of the other set when the holder is moved in an opposite direction.

The lower ends of the two sections of the holder form a tongue 23 which engages a diagonal groove 24 in a block 25 which is connected to the central part of a push rod 26 slidably arranged in the upper part of the core 6, with its ends projecting therefrom so that this push rod will be actuated first by one plunger head and then by the other so that the rod is reciprocated by the reciprocatory movement of the plunger and this movement of the push rod will act to swing the brush holder first in one direction and then in the other due to the engagement of the tongue 23 with the slot 24.

When the brush is in contact with all the rings the coil is short-circuited as the current will pass through the brush. For instance, when a brush is in contact with the set of rings connected with the coil 8, current will flow from the main line 17' to the first ring and then through the brush to the last ring and from this last ring, the current will pass over the conductor $a$ to the coil 8' and from this coil, the current will pass over the return line 17''. Thus the coil 8 will be short-circuited and rendered inactive while the coil 8' is magnetized. Then when the push rod is moved in an opposite direction by the plunger, the brush will be moved away from the rings of the coil 8. Finally, the other brush will engage the rings of the coil 8' so that this coil will be short-circuited while the coil 8 is energized, which will cause the plunger to move in an opposite direction.

Thus the plunger is reciprocated by the shifting of the current from one coil to the other and the gradual break prevents arcing and lengthens the life of the coils. This permits the use of greater electrical force in a practical way.

Buffers 27 are placed on the inner ends of the plunger heads to absorb shock and prevent the plunger from sticking to the core. As shown in Figure 2, the stem is formed with or connected to one head and is threaded to the other. This peculiar arrangement of plunger will increase the attraction effect between the plunger and core and will increase the working surface and permits the plunger to be made entirely of steel.

The tubular parts 3 may be made of sufficient length, as shown at 3' in Figure 9, to prevent the plunger heads from passing entirely through the same, as shown in Figure 9.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. An apparatus of the class described comprising a casing, a plurality of layer formed coils therein, a plunger, a core in the casing said core being of tubular construction, with the plunger passing therethrough and having a portion arranged in each coil, said core being acted on by the energization of the coils to cause reciprocatory movement of the plunger, grouped contacts for the coil layers, an oscillatory brush holder, brushes carried thereby, one for each group of contacts and means for oscillating the brush holder by the reciprocatory movement of the plunger.

2. An apparatus of the class described comprising a casing, a plurality of layer formed coils therein, a plunger, a core in the casing having portions acted on by the energization of the coils to cause reciprocatory movement of the plunger, grouped contacts for the coil layers consisting of a plurality of elements connected with the layers and insulated from each other, an oscillatory brush holder, brushes carried thereby, one for each group of contacts, means for oscillating the brush holder by the reciprocatory movement of the plunger, such means comprising a push rod reciprocated by the plunger, a block on the rod having a diagonal groove therein and a projection on the holder engaging the groove.

3. An apparatus of the class described comprising a casing, a plurality of coils therein, a plunger, a core in the casing having portions acted on by the energization of the coils to cause reciprocatory movement of the plunger, grouped contacts for the coils consisting of a plurality of elements having separate tap connections with corresponding coil layers, an oscillatory brush holder, brushes carried thereby, one for each group of contacts, means for oscillating the brush holder by the reciprocatory movement of the plunger, each brush moving away from a group of contacts before the other brush engages the contacts of the other group.

In testimony whereof I affix my signature.

DAVID HENRY LAMAR.